United States Patent
Kalinowski

(10) Patent No.: US 6,641,036 B1
(45) Date of Patent: Nov. 4, 2003

(54) METHOD FOR IDENTIFYING ELECTRONIC LABELS BY ADAPTIVE ROUNDS

(75) Inventor: Richard Kalinowski, Carnoux-en-Provence (FR)

(73) Assignee: Tagsys (FR)

(*) Notice: Subject to any disclaimer, the term of this patent is extended or adjusted under 35 U.S.C. 154(b) by 17 days.

(21) Appl. No.: 10/018,610

(22) PCT Filed: Jun. 21, 2000

(86) PCT No.: PCT/FR00/01704

§ 371 (c)(1),
(2), (4) Date: Mar. 1, 2002

(87) PCT Pub. No.: WO01/01326

PCT Pub. Date: Jan. 4, 2001

(30) Foreign Application Priority Data

Jun. 25, 1999 (FR) .............................................. 99 08181

(51) Int. Cl.[7] .............................................. G06K 15/00
(52) U.S. Cl. ............. 235/383; 340/825.54; 340/825.35; 340/572
(58) Field of Search ........................................ 235/383

(56) References Cited

U.S. PATENT DOCUMENTS 5,539,394 A * 7/1996 Cato et al. ................ 340/10.32
5,686,902 A    11/1997 Reis et al.
5,883,582 A    3/1999 Bowers et al.
6,377,203 B1 * 4/2002 Doany ........................ 342/44

FOREIGN PATENT DOCUMENTS

WO    WO 98/52142    11/1998
WO    WO 99/12122    3/1999

* cited by examiner

*Primary Examiner*—Michael G. Lee
*Assistant Examiner*—Daniel A. Hess
(74) *Attorney, Agent, or Firm*—Bachman & LaPointe, P.C.

(57) ABSTRACT

The invention concerns a method for identifying electronic labels affixed on products using a querying device, characterized in that it comprises the following steps which consist in: (a) indicating to the electronic labels the number Ns of consecutive emitting windows of a first cycle or round; (b) counting, during the first cycle of Ns windows, the messages received from the electronic labels to determine the number $n_i$ of identifications, the number $n_v$ of windows or blank spaces and the number $n_c$ of collisions; (c) stopping the process if $n_c=0$; or proceeding to step (d) if $n_c \neq 0$; (d) calculating a number Ns1 of emitting windows for the next cycle on the basis of the values of Ns, $n_i$, $n_v$ and $n_c$; going back to step (a) with Ns=computed Ns1.

16 Claims, 3 Drawing Sheets

METHOD FOR IDENTIFYING ELECTRONIC LABELS BY ADAPTIVE ROUNDS

BACKGROUND OF THE INVENTION

The invention relates to the field of electronic labels which are affixed on products in order to identify them according to their attributes and, more particularly, to a procedure for identifying the electronic labels of an ensemble on the basis of their estimated number.

It is known to use "bar" codes which are printed on products in order to identify them and which are read by an optical device during their passage through the check-out of a store. The bar code read makes it possible to interrogate a data-processing device which delivers, for example, the cost of the product.

These bar codes have certain limitations which are essentially due to the fact that they are frozen at the time that they are being printed and therefore cannot be modified during the life of the product.

Thus it has now been proposed to replace bar codes with labels called electronic labels which contain electronic circuits, such as a memory capable of writing an n-bit binary code. This binary code is representative of the bar code, especially for indicating the type of product, but can also represent other information or attributes capable of being modified during the life of the product assuming, of course, that the memory is rewritable for at least certain parts of the n-digit binary code. Thus, it may include the date of sale, the identification of the store, the term of the guarantee, the date of the end of the guarantee, etc.

The interrogation/read/write device may operate in the manner of a bar code read device, that is to say it communicates only with a single electronic label at a time, the one which is presented to it within its volume of radiation.

However, the interrogation/read/write device is capable of simultaneously interrogating all the electronic labels located within its volume of radiation so that these also respond simultaneously and thus cannot be identified from each other.

To solve this problem, it has been proposed to interrogate the electronic labels using various so-called anticollision procedures which make it possible to "manage" the labels which respond simultaneously and which are therefore "in collision".

These anticollision procedures are divided into two classes, namely deterministic and nondeterministic.

In the first class, a first way of operating is to interrogate the electronic labels on the basis, for example, of all or part of the code for identifying the product until a single label responds to this code or part of a code. This first way may result in a high number of interrogations, recognizing that for a code containing n=64 bits, there are more than $10^{19}$ possibilities.

A second way of operating consists in making the interrogation/read/write device repeat that which it receives from the electronic labels and to do so bit by bit or block of bits by block of bits. The electronic labels which recognize the repeated bit or block of bits know that they have been taken into account by the interrogation device and continue alone to transmit another bit or block of bits. These operations are repeated until the selection of a single electronic label.

The deterministic procedures assume that there are not two electronic labels having the same identification code, which constitutes a major constraint if there is a large number of products of the same type, for example in a supermarket, as each article must be labeled differently in order to be recognized.

Furthermore, these deterministic procedures identify only the electronic labels which are presented at the start of implementation of the procedure for a given ensemble.

Any new label with respect to this ensemble cannot be taken into account and must wait for the next cycle of the identification procedure. As a result, these deterministic procedures are therefore not applicable to continuous identification of products, for example those moving along a conveyor belt.

In nondeterministic procedures, the electronic labels are designed to transmit a message after a time interval of random duration starting from an initial point given by the interrogation/read/write device. The electronic label will consider that its message has been recognized if it receives an acknowledgement from the interrogation/read/write device. In the absence of an acknowledgement, the unrecognized electronic label sends its message during the next interrogation cycle after the elapse of a new time interval of random duration.

In such a nondeterministic procedure, it is probable that several electronic labels transmit simultaneously if their total number is substantially greater than the number of random durations provided in one cycle, thereby confusing the message from the electronic label which was transmitted first.

Thus, it has been proposed to make the electronic labels silent upon detection of a transmission from another label, which detection may be performed by the electronic labels themselves or by the interrogation/read/write device.

The performance of nondeterministic procedures is determined by the maximum number $Ns_{max}$ of windows of transmission duration during a cycle in relation to the number N of electronic labels, this number $Ns_{max}$ also defining the number of possible random waiting periods. Thus, in the case of N electronic labels, the procedure is optimal for an $Ns_{max}$ value of Ns1, but in the case of 2N electronic labels the procedure is optimal for an $Ns_{max}$ value of 2Ns1. This has the consequence that the procedure is not suitable for any number of electronic labels.

Moreover, it is not possible to reliably detect two electronic labels which transmit exactly at the same moment. This may give rise to situations in which one electronic label thinks it has been identified by the acknowledgement, whereas the latter was intended for another electronic label.

SUMMARY OF THE INVENTION

One object of the present invention is therefore to implement a procedure of the nondeterministic type for identifying electronic labels affixed on products which makes it possible very rapidly to identify the electronic labels of an ensemble, whatever their number and their identifier.

This object is achieved by adapting the number of random waiting periods or transmission windows to the number of electronic labels remaining to be identified. This adaptation is achieved by the interrogation/read/write device on the basis of the identification results from the preceding cycle.

The invention relates to a procedure for identifying electronic labels affixed on products using an interrogation device, characterized in that it comprises the following steps consisting in:

(a) indicating to the electronic labels the number Ns of consecutive transmission windows of a first cycle or round;

(b) counting, during the cycle of Ns windows, the messages received from the electronic labels in order to determine the number $n_i$ of identifications, the number $n_v$ of blank spaces or windows and the number $n_c$ of collisions;

(c) stopping the procedure if $n_c=0$ or passing to step (d) if $n_c \neq 0$;

(d) computing a number Ns1 of transmission windows for the next cycle on the basis of the values of Ns, $n_i$, $n_v$ and $n_c$; and (e) returning to step (a) with Ns=computed Ns1.

The procedure furthermore includes, in each electronic label, the following steps consisting in:

(m) receiving the number Ns of windows at each cycle or round;

(n) randomly choosing a transmission window from Ns;

(o) transmitting a message during the period of the chosen window;

(p) waiting for a message originating from the interrogation/read/write device;

(q) receiving the acknowledgement of the message transmitted by the interrogation/read/write device in the absence of a collision; and (r) returning to step (m) should there be no acknowledgement, that is to say in the event of a collision or blank window.

BRIEF DESCRIPTION OF THE DRAWINGS

Further features and advantages of the present invention will become apparent on reading the following description of one particular illustrative embodiment, said description being made in relation to the appended drawings in which.

DETAILED DESCRIPTION OF THE PREFERRED EMBODIMENT(S)

Figure 1:
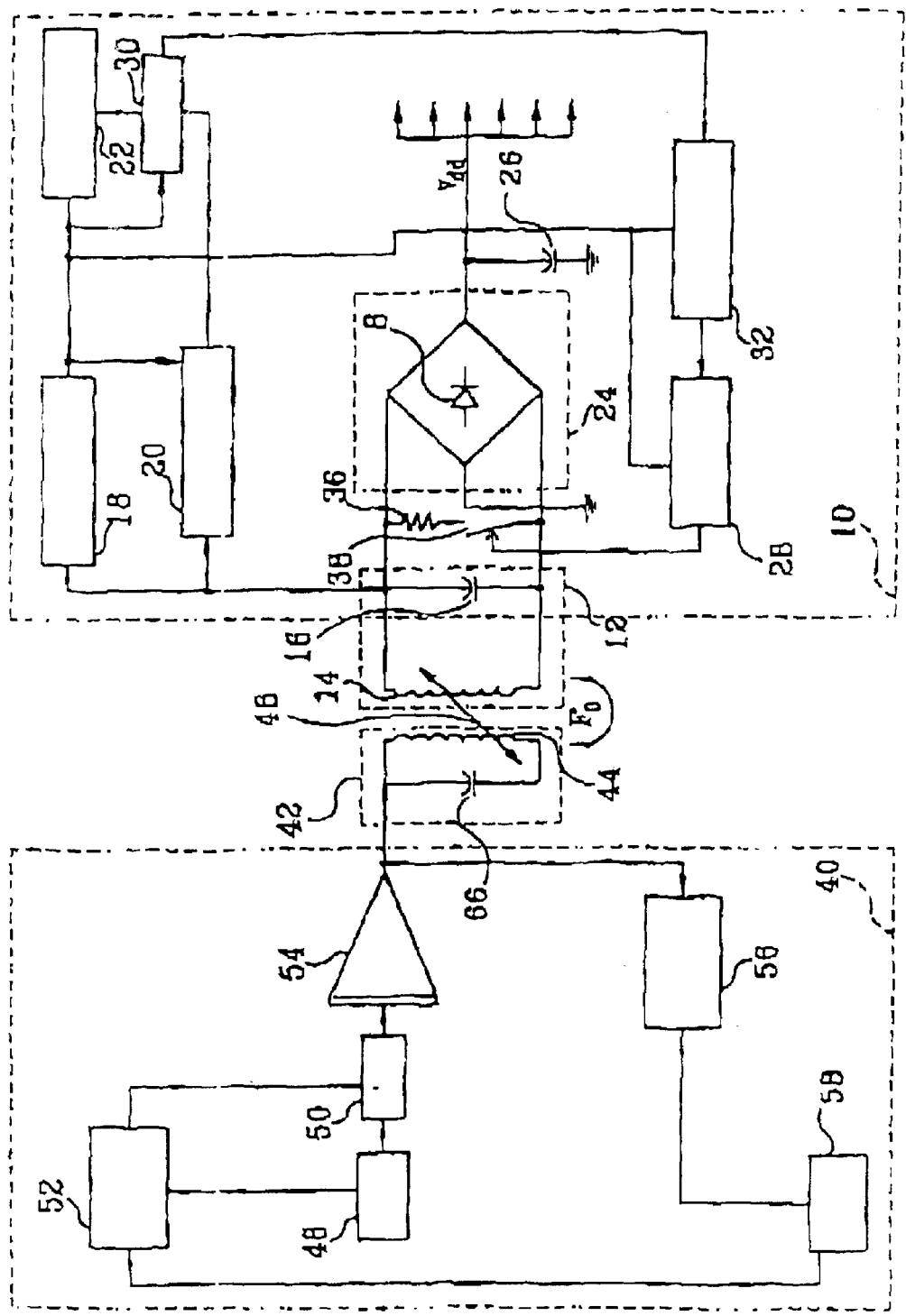
FIG. 1 is a block diagram of a contactless electronic label and of an interrogation/read/write device for such an electronic label, to which label and which device the procedure according to the invention applies.
Figure 2:
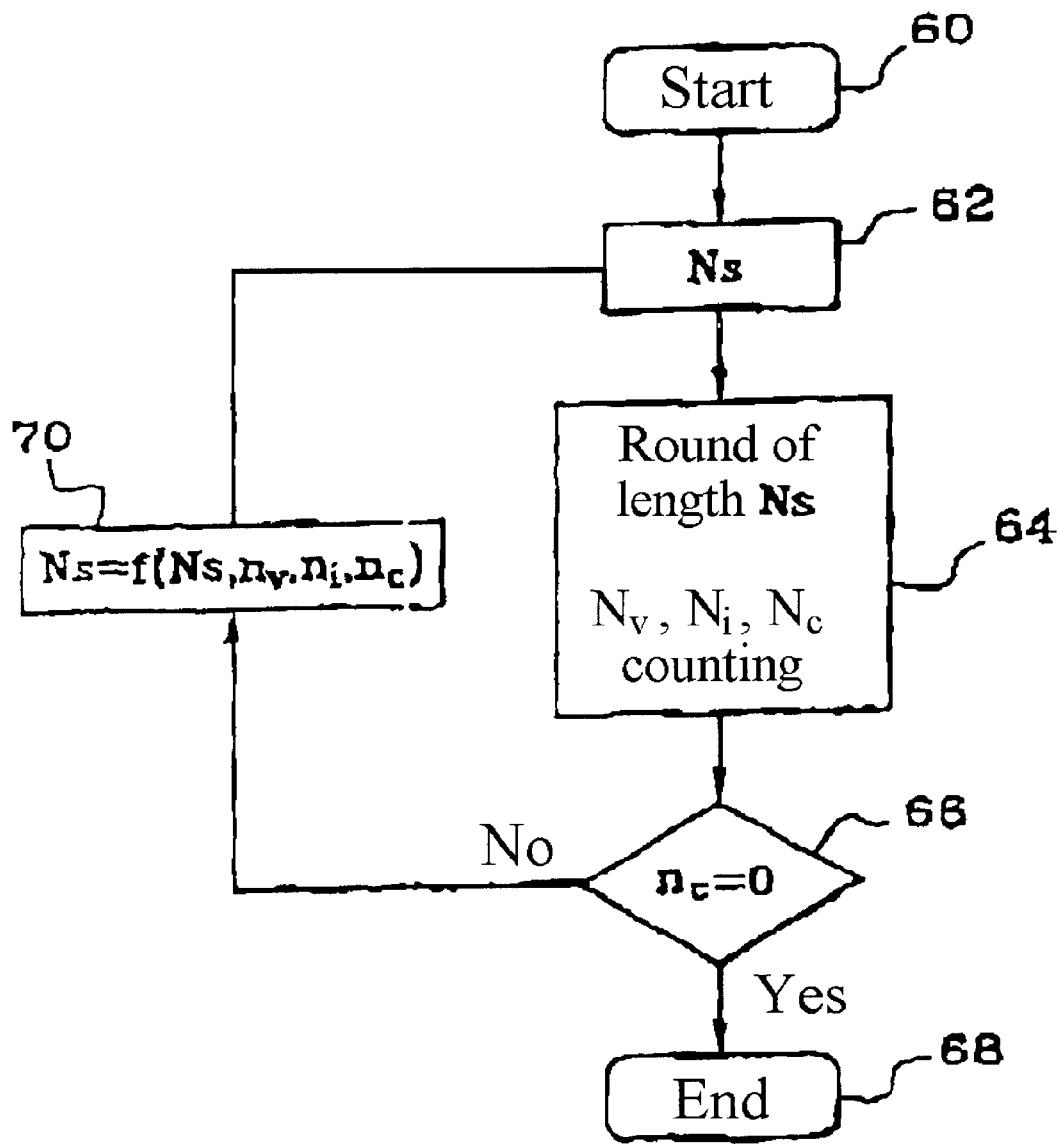
FIG. 2 is a diagram showing the various steps of the procedure according to the invention.

A contactless electronic label 10 comprises, for example (FIG. 1), an antenna 12 consisting of a tuned circuit which comprises an induction coil 14 and a capacitor 16. The tuning frequency $F_0$ of the antenna 12 is, for example, 13.56 megahertz.

This tuned circuit of the antenna is connected to various circuits which each carry out a particular function. Thus, a circuit 24 carries out the function of full-wave rectification of the signal at the terminals of the tuned circuit, for example by a diode bridge 8. This rectification circuit 24 is followed by a capacitor 26 for filtering the rectified signal, which delivers the supply voltage $V_{dd}$ for all the other circuits of the electronic circuit, especially those shown in rectangle 10 in FIG. 1.

A circuit 18 carries out the function called the clock function and the synchronization of the latter based on the frequency $F_0$. The signals at various frequencies delivered by this clock circuit 18 are applied to the other circuits of the label shown or otherwise, except for the antenna 12 and for the rectification circuit 24.

The circuit 20 carries out the function of demodulating and decoding the signals which modulate the signal at the carrier frequency $F_0$, which signals constitute the information received by the label.

The information relating to the product with which the label is associated is recorded in a memory 22 which is addressable by a write/read circuit 30.

This write/read circuit 30 is under the control of the signals detected and decoded by the circuit 20 and delivers signals which are applied to a message synthesis circuit 32.

The messages delivered by the synthesis circuit 32 are applied to an antenna load modulation circuit, which has been shown schematically by a circuit 28, and by a switch 38 controlled by the circuit 28. A load resistor 36 has been shown in series with the switch 38.

The interrogation/read/write device for the label 10 comprises, for example in a known manner, an antenna 42 consisting of a tuned circuit which comprises an induction coil 44 and a capacitor 66, the tuning frequency being $F_0$. The two antennas 12 and 42 are magnetically coupled, as shown by the arrow 46.

The antenna 42 is supplied by electrical signals at the carrier frequency $F_0$, which are modulated by low-frequency digital signals carrying the information to be transmitted to the label 10. These modulated electrical signals are generated by a modulator 50 which receives, on the one hand, a signal at the frequency $F_0$ of an oscillator 48 and the modulation signals from a message generator 52. The output signals of the modulator 50 are applied to a power amplifier 54, the output terminal of which is connected directly to the antenna 42.

The signals received by the antenna 42 are applied to a receiving circuit 56 which detects, demodulates and decodes them. The decoded signals are applied to a microprocessor 58 which interprets them and delivers the control signals for the message generator 52.

The procedure according to the invention will be described in relation to an ensemble comprising electronic labels of the type described by means of FIG. 1 and an interrogation device also described by means of FIG. 1.

After a start (rectangle 60), the procedure comprises the following steps consisting in:

(a) indicating to the electronic labels the number Ns of consecutive transmission slots or windows of a first cycle or round (rectangle 62);

(b) counting, during the cycle of Ns windows, the messages received from the electronic labels in order to determine the number $n_i$ of identifications, the number $n_v$ of blank spaces or windows and the number $n_c$ of collisions (rectangle 64);

(c) stopping the procedure if $n_c=0$ (rectangle 68) or passing to step (d) if $n_c \neq 0$;

(d) computing a number Ns1 of transmission windows for the next cycle on the basis of the values of Ns, $n_i$, $n_v$ and $n_c$ (rectangle 70); and (e) returning to step (a) with Ns=computed Ns1 (rectangle 62).

Figure 3:
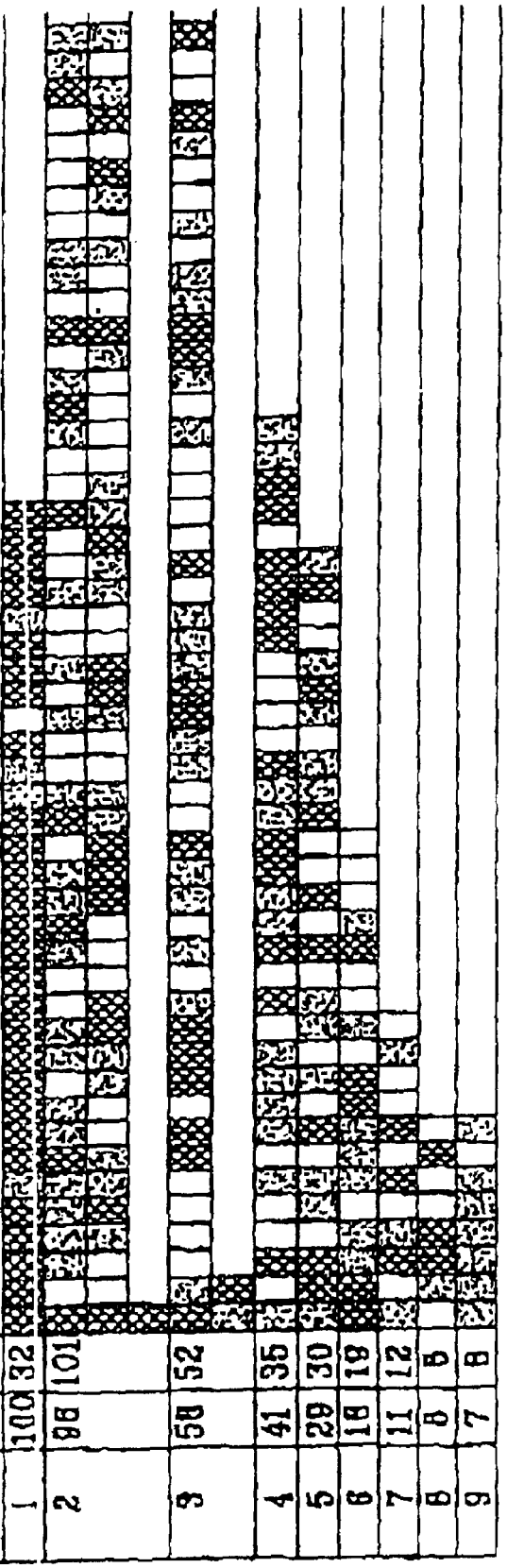
FIG. 3 is a diagram showing the execution of the procedure in the case of one hundred electronic labels.

FIG. 3 illustrates the steps of the procedure according to the invention in the case in which N=100 and Ns=32.

The first cycle or the first round comprises thirty-two windows (step (a)) and takes into account the fact that N=100 is much greater than Ns=32; the number of collisions will, for example, be $n_c=27$, with $n_i=4$ identifications and one blank window $n_v=1$, which is compatible with step (b).

Since $n_c \neq 0$, there is a transition to step (d) which consists in a computing a value of Ns1 on the basis of Ns=32, $n_c=27$, $n_i=4$ and $n_v=1$, which gives Ns=101 for Nr=96 electronic labels remaining to be identified.

This number Ns=101 is indicated to the electronic labels remaining to be identified (step (a)), these randomly selecting to transmit in one window among 101.

This results in a second step (b) in which $n_i$=38 identifications, $n_c$=22 collisions and $n_v$=11 blank windows are counted.

The calculation for the second step (d) results in Ns=52, which number is indicated to the electronic labels remaining to be identified (3rd step (a)), the latter randomly selecting to transmit in one window among 52.

The counting of the third step (b) determines the values of $n_i$=17, $n_c$=15 and $n_v$=20 which make it possible to compute a new Ns=35 (3rd step (d)) for a fourth cycle or round.

This fourth cycle makes it possible to identify $n_i$=12 labels and to count $n_c$=12 collisions and $n_v$=11 blank windows, giving a new Ns=30 for the fifth cycle.

This fifth cycle results in $n_i$=11, $n_c$=6 and $n_v$=11, i.e. a new Ns=19 for the sixth cycle.

This sixth cycle results in $n_i$=7, $n_c$=5 and $n_v$=7, i.e. a new Ns=12 for the seventh cycle.

This seventh cycle results in $n_i$=3, $n_c$=3 and $n_v$=6, i.e. a new Ns=8 for the eighth cycle.

This eighth cycle results in $n_i$=1, $n_c$=3 and $n_v$=4, i.e. a new Ns=8 for the ninth cycle.

This ninth cycle results in $n_i$=7, $n_c$=0 and $n_v$=1.

Since there is no collision, the procedure passes to the end-of-procedure step (c) (rectangle 68).

The steps of the procedure which have just been described correspond to one particular operation of the electronic labels, the following steps of which consist in:

(m) receiving the number Ns of windows at each cycle or round;

(n) randomly choosing a transmission window from Ns;

(o) transmitting a message during the period of the chosen window;

(p) waiting for a message originating from the interrogation/read/write device;

(q) receiving the acknowledgement of the message transmitted by the interrogation/read/write device in the absence of a collision; and (r) returning to step (m) should there be no acknowledgement, that is to say in the event of a collision.

Steps (a) to (e) and (m) to (r) which have just been described may represent alternative embodiments according to the invention.

The numbers Ns and N may be such that the first cycle does not allow a single electronic label to be identified, for example Ns1=8 for N=100, which results in $n_c$=8 collisions and therefore makes it impossible to compute Ns for the second cycle.

The invention therefore proposes to select the values Ns for the second cycle as an integer multiple of Ns1, for example Ns=4Ns1=32.

The number Ns has been defined as determining the number of transmission windows in one cycle or round, each window start corresponding to a random duration counting from the start of the cycle.

In the example described in relation to FIG. 3, it has been assumed that this random duration was counted in terms of the number of windows, which means that the electronic labels transmit at the start of the randomly selected window. This operation results in a procedure identifying a duration equal to at least Ns.d if d is the fixed duration of a window. This total duration may be reduced if one takes into account the fact that it is possible to shorten the duration of the blank windows or windows with collisions by switching to the next window as soon as they are detected.

For this purpose, the interrogation device may be designed to transmit a stop signal to all the labels as soon as it is in receipt of at least one electronic label and to transmit a signal to switch to the next window as soon as the end of identification of a label or as soon as a blank window or collision has been detected.

Ns is determined by estimating firstly the number Np of electronic labels present during the round, it being possible for this estimate to be made by various procedures. This estimated value Np makes it possible to compute the number Nr of electronic labels which remain to be identified, using the formula Nr=Np−$n_i$.

This determination of Ns for a new cycle is different depending on whether the procedure is implemented by a random selection among Ns windows or slots corresponding to a so-called "slot" operation or by a random selection of Ns durations counting from an origin corresponding to an operation called "random waiting" operation.

In the first case, called slot operation, the number Np is determined, for example, by the proportions procedure or the distance procedure.

According to the proportions procedure, the number Np is the higher of two numbers which are (2$n_c$+$n_i$) and N', $n_c$ being the number of collisions, $n_i$ being the number of labels identified and N' being given by one of the following formulae:

$$N'=n_i(Ns-1)/n_v, \text{ if } n_i \neq 0 \text{ and } n_v \neq 0$$

or N'=(Ns−1)/$n_v$, if $n_i$=0 and $n_v \neq$0
or N'=$n_i$($N_s$−1), if $n_i \neq$0 and $n_v$=0
or N'=k.Ns in the other cases;
 $n_v$ being the number of blank slots;
 k being a constant fixed a priori, for example k=4 as indicated above.

According to the distance method, if $n_i$=$n_v$=0, then Np=k.Ns. Otherwise, Np is the value greater than or equal to (2$n_c$+$n_i$) which minimizes the distance function selected.

Among the known distance functions, there is the Manhattan distance defined by:

$$d(x)=|xA^{x-1}-n_i|+|NsA^x-n_v|$$

There is the two-dimensional distance defined by:

$$d'(x)=(xA^{x-1}-n_i)^2+(NsA^x-n_v)^2$$

There is the three-dimensional distance defined by:

$$d''(x)=(xA^{x-1}-n_i)^2+(NsA^x-n_v)^2+(xA^{x-1}+NsA^x-n_i-n_v)^2$$

with A=(Ns−1)/Ns.

These distance functions are not a minimum if $n_i$=$n_v$=0 and tend toward 0 when Np tends toward infinity. In this case, as indicated above, Np will be taken to be equal to k.Ns.

Np being determined as indicated above, the value of Ns for the new cycle will be that which maximizes the function:

$$r(Ns)-[I(Nr,Ns)]/[Lv.V(Nr,Ns)+Li.I(Nr,Ns)+Lc.C(Nr,Ns)] \quad (1)$$

in which:

I(Nr,Ns) is the average number of labels identified with Nr labels and a cycle of Ns windows;

V(Nr,Ns) is the average number of blank windows;

C(Nr,Ns) is the average number of collisions;

Lv is the average duration of a blank window until intervention by the interrogation device, as indicated above;

Li is the duration of an identification window; and

Lc is the average duration of a collision until intervention by the interrogation device.

In the second case, called random waiting function, the invention will be described in its application to operation in which the electronic labels transmit identification messages at random moments counting from the start of a window randomly selected from Ns windows. Thus, the electronic label randomly generates a temporal shift and a slot number from among Ns slots, the temporal shift being measured with respect to the start of the selected slot. In this case, the functions defined previously for slot operation may be used on condition that they are adapted in order to take account of particular parameters which are:

T being the size of the message as the number of bits;

$\delta$ being the maximum value of the random shift in number of bits, this value being less than the size T of the message; and $\lambda$ being the average time in terms of bits which is needed between the detection of a transmission by the interrogation/read/write device and the sending of the transmission stop message indicated above; this average time $\lambda$ may be taken to be equal to T if the device does not have the possibility of sending the transmission stop message.

The number V' of blank slots, expressed as the number of bits, the number C' of collisions, expressed as the number of bits, and I, the number of identified labels, are then estimated by:

$$V'(Np,Ns)=\delta.Ns(Ns-\lambda)^{Np}/(\delta Ns)^{Np}+(T-\delta)Ns$$

$$I'(Np,Ns)=Nr(\delta Ns-2\lambda)^{Np-1}/(\delta Ns)^{Np-1}$$

$$C'(Np,Ns)=T.Ns-\lambda I'(Np,Ns)-V'(Np,Ns)$$

The value of Np is then estimated by one of the distance functions, such as:

the Manhattan distance:

$$d(x)=|I'(x, Ns)-n_i|+|V'(x, Ns)-n'_v|$$

the two dimensional distance:

$$d'(x)=(I'(x, Ns)-n_i)^2+(V'(X, Ns)-n'_v)^2$$

the three dimensional distance:

$$d''(x)=(I'(x, Ns)-n_i)^2+(V'(x, Ns)-n'_v)^2+(C'(X, Ns)-n'_c)^2$$

In the case of the proportions method, the value N' is given by:

$$N'=(n_i.B)/[n_v-(T-\delta)Ns], \text{ if } n_i \neq 0 \text{ and } n'_v \neq (T-\delta)Ns$$

or N'=B/[n$_v$-(T-$\delta$)Ns], if n$_i$=0 and n'$_v$≠(T-$\delta$)Ns or N'=kNs in the other cases, whereas Np=max(2n$_c$+n$_i$, N'), with B=$\delta$Ns-3$\lambda$/2;

n$_i$ being the number of labels identified;

n'$_v$ being the number of bits during which there is no transmission (blanks);

n$_c$ being the number of collisions observed;

n'$_c$ being the number of bits in collision.

In the second case that has just been described, it is possible to reduce the number of collisions by stopping the downcounting of the random durations in the labels as soon as a message from one label has been received and by repeating it after the label in question has been identified.

Although the second case has been described in its application to one particular operation, the invention applies to any operation in which the random waiting periods of the electronic labels before transmission of the identification messages are measured counting from the start of the round.

Next, the value of Ns is determined by the formula (1) as in the first case, using:

$$Nr=Np-n_i.$$

What is claimed is:

1. A procedure for identifying electronic labels affixed on products using an electronic interrogation/read/write device wherein the electronic labels and the electronic device are each capable of receiving and transmitting messages, said procedure comprising the steps of:

(a) indicating to the electronic labels the number Ns of consecutive transmission windows of a first cycle or round;

(b) during the cycle of Ns windows, counting the messages received from the electronic labels in order to determine a number n$_i$ of identifications, a number n$_v$ of blank spaces or windows and a number n$_c$ of collisions;

(c) stopping the procedure if n$_c$=0 or passing to step (d) if n$_c$≠0;

(d) computing a number Ns1 of transmission windows for a next cycle on the basis of the values of Ns, n$_i$, n$_v$ and n$_c$; and (e) returning to step (a) with Ns=computed Ns1.

2. The procedure as claimed in claim 1, further comprising in each electronic label:

(m) receiving the number Ns of windows at each cycle or round;

(n) randomly choosing a transmission window from Ns;

(o) transmitting a message during the period of the chosen transmission window;

(p) waiting for a message originating from an interrogation device;

(q) receiving an acknowledgement of the message transmitted by the interrogation device in the absence of a collision; and (r) returning to step (m) should there be no acknowledgement.

3. The procedure as claimed in claim 1, further comprising that, if n$_i$=n$_v$0, step (d) comprises computing a number Ns1 of transmission windows for the next cycle which is a multiple of the number Ns of the cycle which has just terminated.

4. The procedure as claimed in claim 1, further comprising the number Ns for the next cycle being computed by:

estimating a number Nr of labels remaining to be identified;

choosing the value of Ns which maximizes the function:

$$r(Ns)-[I(Nr,Ns)]/[Lv.V(Nr,Ns)+Li.I(Nr,Ns)+Lc.C(Nr,Ns)]$$

where:

I(Nr,Ns) is an average number of labels identified with Nr labels and Ns windows;

V(Nr,Ns) is an average number of blank windows;

C(Nr,Ns) is an average number of collisions;

Lv is an average duration of a blank window until intervention by the interrogation device;

Li is a duration of an identification window; and
Lc is an average duration of a collision until intervention by the interrogation device.

5. The procedure as claimed in claim 4, further comprising the number Nr being equal to (Np−$n_i$) and Np being given by the larger of the two numbers ($2n_c+n_i$) and N', where:

$$N'=n_i(Ns-1)/n_v, \text{ if } n_i \neq 0 \text{ and } n_v \neq 0$$

or N'=(Ns−1)/$n_v$, if $n_i$=0 and $n_v \neq$0
or N'=$n_i$($N_s$−1), if $n_i \neq$0 and $n_v$=0
or N'=k.Ns in the other cases;
$n_v$ being the number of blank slots; and
k being a constant fixed a priori.

6. The procedure as claimed in claim 4, further comprising the number Nr being equal to (Np−$n_i$) and the number Np being a value greater than or equal to $2n_c$ which minimizes a Manhattan distance function defined by:

$$d(x)=|xA^{x-1}-n_i|+|NsA^x-n_v|$$

with A=(Ns−1)/Ns.

7. The procedure as claimed in claim 4, further comprising the number Nr being equal to (Np−$n_i$) and the number Np being a value greater than or equal to $2n_c$ which minimizes a two-dimensional distance function defined by:

$$d'(x)=(xA^{x-1}-n_i)^2+(NsA^x-n_v)^2$$

with A=(Ns−1)/Ns.

8. The procedure according to claim 4, further comprising the number Nr being equal to (Np−$n_i$) and the number Np being a value greater than or equal to $2n_c$ which minimizes a three-dimensional distance function defined by:

$$d''(x)=(xA^{x-1}-n_i)^2+(NsA^x-n_v)^2+(xA^{x-1}+NsA^x-n_i-n_v)^2$$

with A=(Ns−1)/Ns.

9. The procedure as claimed in claim 4, further comprising the number Nr being equal to (Np−$n_i$) and the number Np being taken equal to kNs if $n_i$=$n_v$=0, and k being an integer.

10. The procedure as claimed in claim 4, in its application to said electronic labels transmitting identification messages at random moments further comprising counting from a start of a window randomly selected from Ns windows, and the number Nr being equal to (Np−$N_i$) and the number Np being given by the larger of the two numbers ($2n_c+n_i$) and N', with:

$$N'=(n_i.B)/[n'_v-(T-\delta)Ns], \text{ if } n_i \neq 0 \text{ and } n'_v \neq (T-\delta)Ns$$

or N'=B/[$n'_v$−(T−δ)Ns], if $n_i$=0 and $n'_v \neq$(T−δ)Ns
or N'=kNs in the other cases,
where Np=max($2n_c+n_i$, N')

$$B=\delta Ns-3\lambda/2;$$

$n_i$ is a number of labels identified;
$n'_v$ is a number of bits during which there is no transmission;
$n_c$ is a number of collisions observed;
T is a message size as a number of bits;
δ is a maximum value of a random shift in number of bits, with this value being less than the size T of the message; and
λ is an average time in terms of bits which is needed between the detection of a transmission by the interrogation/read/write device and the sending of the transmission stop message.

11. The procedure as claimed in claim 4, in its application to labels transmitting identification messages at random moments further comprising counting from a start of a window selected randomly from Ns windows, and the number Nr being equal to (Np−$N_i$), and the value of Np being estimated by a Manhattan distance function defined by:

$$d(x)=|I'(x,Ns)-n_i|+|V'(x,Ns)-n'_v|$$

with:

$V'(Np,Ns)=\delta.Ns(\delta Ns-\lambda)^{Np}/(\delta Ns)^{Np}+(T-\delta)Ns$
$I'(Np,Ns)=Np(\delta Ns-2\lambda)^{Np-1}/(\delta Ns)^{Np-1}$
$C'(Np,Ns)=T.Ns-\lambda I'(Np,Ns)-V'(Np,Ns)$, where
T is a message size as a number of bits;
δ is a maximum value of a random shift in number of bits, with this value being less than the size T of the message; and
λ is an average time in terms of bits which is needed between the detection of a transmission by the interrogation device and the sending of the transmission stop message.

12. The procedure as claimed in claim 4, in its application to labels transmitting identification messages at random moments further comprising counting from a start of a window randomly selected from Ns windows, and the number Nr being equal to (Np−$n_i$), and the value of Np being estimated by the two-dimensional distance function defined by:

$$d'(x)=(I'(X,Ns)-n_i)^2+(V'(X,Ns)-n'_v)^2$$

with:

$V'(Np,Ns)=\delta.Ns(\delta Ns-\lambda)^{Np}/(\delta Ns)^{Np}+(T-\delta)Ns$
$I'(Np,Ns)=Nr(\delta Ns-2\lambda)^{Np-1}/(\delta Ns)^{Np-1}$, and where
T is a message size as a number of bits;
δ is a maximum value of a random shift in number of bits, with this value being less than the size T of the message; and
λ is an average time in terms of bits which is needed between the detection of a transmission by the interrogation device and the sending of the transmission stop message.

13. The procedure as claimed in claim 4, in its application to labels transmitting identification messages at random moments further comprising counting from a start of a window randomly selected from $N_S$ windows, and the number Nr being equal to (Np−$n_i$), and the value of Np being estimated by a three-dimensional distance function defined by:

$$d''(x)=(I'(x,Ns)-n_i)^2+(V'(x,Ns)-n_v)^2+(C'(x,Ns)-n'_c)^2$$

with $V'(Np,Ns)=\delta.Ns(\delta Ns-\lambda)^{Np}/(\delta Ns)^{Np}+(T-\delta)Ns$
$I'(Np,Ns)=Np(\delta Ns-2\lambda)^{Np-1}/(\delta Ns)^{Np-1}$
$C'(Np,Ns)=T.Ns-\lambda I'(Np,Ns)-V'(Np,Ns)$, and where
T is a message size as a number of bits;
δ is a maximum value of a random shift in number of bits, with this value being less than the size T of the message;

λ is an average time in terms of bits which is needed between the detection of a transmission by the interrogation device and the sending of the transmission stop message; and $n'_c$ is a number of bits in collision.

14. The procedure as claimed in claim 1, further comprising, during each transmission window, transmitting a transmission stop signal to all of the electronic labels as soon as a message originating from at least one electronic label has been received.

15. The procedure as claimed in claim 1, further comprising, during each transmission window, transmitting a signal for switching to the next window as soon as an end of an identification by an electronic label.

16. The procedure as claimed in claim 1, further comprising, during each transmission window, transmitting a signal for switching to the next window as soon as a collision or a blank window has been detected.

* * * * *